(12) United States Patent
White et al.

(10) Patent No.: US 8,758,535 B2
(45) Date of Patent: Jun. 24, 2014

(54) INSERT WITH INTEGRATED FASTENER

(75) Inventors: Erin White, Wales Township, MI (US);
Eric N White, Wales Township, MI (US); John Gillespie, Romeo, MI (US);
Olaf Nitsche, Rochester Hills, MI (US)

(73) Assignee: Zephyros, Inc., Romeo, MI (US)

( * ) Notice: Subject to any disclaimer, the term of this patent is extended or adjusted under 35 U.S.C. 154(b) by 574 days.

(21) Appl. No.: 12/405,276

(22) Filed: Mar. 17, 2009

(65) Prior Publication Data
US 2009/0233055 A1    Sep. 17, 2009

Related U.S. Application Data

(60) Provisional application No. 61/037,143, filed on Mar. 17, 2008, provisional application No. 61/038,436, filed on Mar. 21, 2008.

(51) Int. Cl.
*B29C 65/02* (2006.01)

(52) U.S. Cl.
USPC .............................................. 156/83; 156/293

(58) Field of Classification Search
USPC ............. 181/270, 264, 269; 264/343; 156/83, 156/293
See application file for complete search history.

(56) References Cited

U.S. PATENT DOCUMENTS

| | | | |
|---|---|---|---|
| 6,093,358 A * | 7/2000 | Schiewe et al. ................ | 264/250 |
| 6,455,146 B1 * | 9/2002 | Fitzgerald ................... | 428/318.4 |
| 6,988,585 B2 * | 1/2006 | Mourieras et al. ............ | 181/204 |
| 7,125,461 B2 | 10/2006 | Czaplicki et al. | |
| 7,199,165 B2 | 4/2007 | Kassa et al. | |
| 7,313,865 B2 | 1/2008 | Czaplicki et al. | |
| 8,028,799 B2 | 10/2011 | Hasler | |
| 8,079,442 B2 | 12/2011 | Wojtowicki | |
| 8,087,916 B2 | 1/2012 | Kanie et al. | |
| 8,293,360 B2 | 10/2012 | Cousin et al. | |
| 8,388,037 B2 | 3/2013 | LaNore et al. | |
| 8,444,214 B2 | 5/2013 | Helferty | |
| 8,469,143 B2 | 6/2013 | Prunarety et al. | |
| 2004/0011282 A1 | 1/2004 | Myers et al. | |

(Continued)

FOREIGN PATENT DOCUMENTS

| | | |
|---|---|---|
| DE | 198 35 704 A1 | 2/2000 |
| EP | 2176113 B1 | 4/2011 |

(Continued)

OTHER PUBLICATIONS

International Search Report for related PCT Application: US/2009/037337 filed Mar. 17, 2009; Published as WO 2009/117376 A1 on Sep. 24, 2009. IPRP.

(Continued)

*Primary Examiner* — Katarzyna Wyrozebski Lee
*Assistant Examiner* — Scott W Dodds
(74) *Attorney, Agent, or Firm* — The Dobrusin Law Firm, PC

(57) ABSTRACT

A method for locally reinforcing or baffling a structure having a hollow cavity is disclosed. The present invention provides an insert that includes a carrier, a thermally expandable material located on at least a portion of the carrier, and at least one integrally formed attachment that projects outwardly from the carrier. The inserts of the present invention are preferably placed within a hollow cavity in a transverse direction so that once the insert is sealed into place via the thermally expandable material, the hollow cavity is separated into two separate chambers.

25 Claims, 4 Drawing Sheets

(56) References Cited

U.S. PATENT DOCUMENTS

| | | |
|---|---|---|
| 2005/0082111 A1* | 4/2005 | Weber .......................... 181/204 |
| 2006/0073266 A1 | 4/2006 | Myers et al. |
| 2008/0110694 A1 | 5/2008 | Niezur et al. |
| 2009/0111371 A1 | 4/2009 | Niezur et al. |
| 2010/0320028 A1 | 12/2010 | Wojtowicki |
| 2011/0057392 A1 | 3/2011 | Monnet et al. |
| 2011/0192675 A1 | 8/2011 | Lecroart et al. |
| 2012/0207986 A1 | 8/2012 | Belpaire et al. |
| 2013/0087406 A1 | 4/2013 | Franey |
| 2013/0140731 A1 | 6/2013 | Belpaire |
| 2013/0181470 A1 | 7/2013 | LaNore et al. |

FOREIGN PATENT DOCUMENTS

| | | |
|---|---|---|
| EP | 1534561 B1 | 8/2013 |
| EP | 2262633 B1 | 9/2013 |
| JP | 11-165598 A | 6/1999 |
| JP | 2002347058 | 12/2002 |
| JP | 2004-230834 A | 8/2004 |
| JP | 2002-347058 A | 12/2004 |
| JP | 2006-123710 A | 5/2006 |
| WO | 00/43253 A | 7/2000 |
| WO | 2009/117376 A1 | 9/2009 |
| WO | 2011/134943 A1 | 11/2011 |
| WO | 2011/147872 A1 | 12/2011 |

OTHER PUBLICATIONS

Written Opinion for related PCT Application: US/2009/037337 filed Mar. 17, 2009; Published as WO 2009/117376 A1 on Sep. 24, 2009. IPRP.
International Preliminary report on Patentability for related PCT ApplicationL US/2009/037337 filed Mar. 17, 2009; Published as WO 2009/117376 A1 on Sep. 24, 2009.
Chinese Office Action dated Sep. 26, 2011; Appl. No. 200980109337.3.
Japanese Office Action dated Aug. 6, 2013; Appln. No. 2011-500887.

* cited by examiner

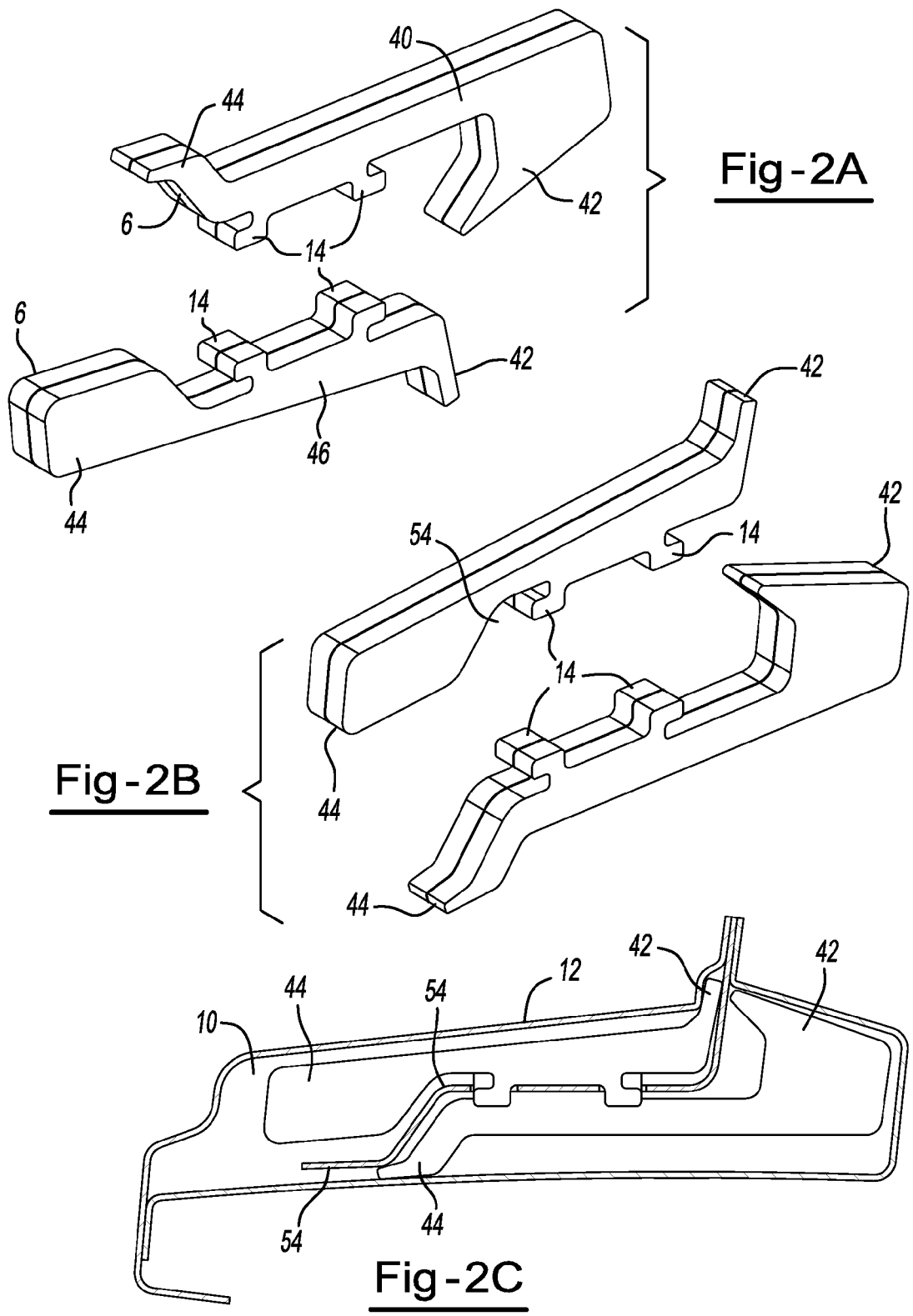

INSERT WITH INTEGRATED FASTENER

CLAIM OF PRIORITY

The present invention claims the benefit of the priority of U.S. Provisional Application Ser. No. 61/037,143 filed Mar. 17, 2008, 61/038,436 filed Mar. 21, 2008, the contents of which are incorporated by reference herein.

TECHNICAL FIELD

The present invention relates generally to a baffling, sealing or reinforcement member that includes a carrier with an integrated fastener.

BACKGROUND

The transportation industry continues to require methods of baffling, sealing and reinforcement that provide improved functionality while simultaneously providing a reduction in material amount, weight, and cost. Due to geometric constraints and this effort to reduce materials and costs, there is a need in the art of baffling, sealing or reinforcement of structures to provide alternatives to existing designs that typically employ a mechanical fastener (e.g., a push-pin or Christmas tree type fastener). Often, those structures including a mechanical fastener also experience an increase in material used and cost due to the presence of the fastener. It is therefore desirable to have a method for sealing, baffling or reinforcement that includes a fastening function without the added material and cost associated with the traditional fasteners referenced above. In addition, these structures must also lend themselves to easy installation on an assembly line, such as an automotive assembly line.

SUMMARY OF THE INVENTION

In a first aspect the present invention contemplates a method for locally reinforcing or baffling a structure having a hollow cavity, comprising the steps of: providing an insert including a generally flat carrier having a first face and an opposing second face each terminating at a peripheral edge, wherein the carrier includes a thermally expandable polymeric material on at least a portion of one of the first or second faces and includes at least one integrally formed attachment that projects outwardly from the peripheral edge; inserting the attachment through an aperture in a wall of the structure; at least partially rotating the integrally formed attachment, so that after such rotating the first face and the second face project generally transversely into the cavity and a gap is defined between the peripheral edge and the wall of the structure; heating the thermally expandable polymeric material to cause it to expand and seal the gap that exists between the peripheral edge and the wall of the structure; thereby separating the hollow cavity into separate chambers on either side of the insert.

This first aspect of the invention may further be characterized by one or any combination of the following features: the generally flat carrier is constructed of metal, polymeric material, elastomeric material, fibrous material, thermoplastic material, plastics, nylon, or any combination thereof; the generally flat carrier is a metal sheet; the attachment includes at least two spaced apart projections; the attachment includes only one projection; the insert is held in place within the hollow cavity, prior to the heating step, solely by the attachment; the attachment includes a laterally projecting arm that has a free end; the free end projects transversely outward; the free end projects transversely inward; the carrier includes at least one cut-out through which a component passes in the resulting final structure; the at least partially rotating step includes a step of flexing the insert to a stress within its elastic limits and below its plastic yield stress, so that permanent deformation does not occur during installation; the at least partially rotating step includes a step of flexing the insert, so that permanent deformation occurs during installation; the insert includes two carriers, each of which is located within a separate cavity; the insert includes two carriers such that each of the carriers are located within a separate cavity and are substantially juxtaposed to each other within the resulting structure, but are separated by a wall of the structure; the attachment includes at least two laterally projecting arms that are spaced apart and when measured from center to center of the arms at the juncture of the peripheral edge are approximately the same spacing as the apertures into which they are inserted; the peripheral edge includes at least three continuously adjoining edge portions and the at least three continuously adjoining edge portions are joined by an arcuate edge portion; the peripheral edge includes at least one substantially straight edge portion; the peripheral edge includes at least one substantially straight edge portion from which the attachment projects; the insert includes at least one notch cut out from the peripheral edge; the insert includes a main body portion, a portion that projects upwardly from the main body portion, and a portion that projects downwardly from the main body portion, and wherein the attachment projects away from the main body portion; the peripheral edge of the insert without including the attachment, follows the contours of the hollow cavity.

In another aspect, the present invention contemplates a method for locally reinforcing or baffling a structure having a hollow cavity of a vehicle, comprising the steps of: providing an insert including a generally flat carrier having a first face and an opposing second face each terminating at a peripheral edge having at least one substantially straight edge portion, wherein the carrier: includes a thermally expandable polymeric material on at least a portion of one of the first or second faces; includes at least one integrally formed attachment that projects outwardly from the peripheral edge, wherein the attachment includes at least two spaced apart projections; and includes at least one integrated structure that locally modifies the surface topography structure of the carrier, imparts at least one local property or performance modification within the carrier, or both; inserting the attachment through an aperture in a wall of the structure; at least partially rotating the integrally formed attachment, so that after such rotating the first face and the second face project generally transversely into the cavity and a gap is defined between the peripheral edge and the wall of the structure; heating the thermally expandable polymeric material to cause it to expand and seal the gap that exists between the peripheral edge and the wall of the structure; thereby separating the hollow cavity into separate chambers on either side of the insert.

In yet another aspect, the present invention contemplates an insert comprising a generally flat carrier having a first face and an opposing second face that each terminate at a peripheral edge, wherein the carrier includes: a thermally expandable polymeric material on at least a portion of one of the first or second faces; and includes at least one integrally formed attachment that projects outwardly from the peripheral edge.

This aspect may further be characterized by one or any combination of the following features: the carrier includes opposing substantially parallel faces that have a surface topography that varies along its length, the peripheral edge of the insert lies substantially in a common plane along the entirety of the part.

DESCRIPTION OF THE DRAWINGS

FIG. 2A illustrates a perspective view of another insert embodiment of the present invention (in a pre-expanded state).

FIG. 2B illustrates an additional perspective view of the insert embodiment shown in FIG. 2A.

FIG. 2C illustrates the insert embodiment shown in FIGS. 2A and 2B located within a vehicle cavity.

DETAILED DESCRIPTION

The present invention provides an insert that includes a carrier, an expandable material (e.g., thermally expandable material) located on at least a portion of the carrier, and at least one integrally formed attachment (which may be generally coplanar with the carrier) that projects outwardly (e.g., laterally) from the carrier. The inserts of the present invention are preferably placed within a hollow cavity in a transverse direction so that once the insert is sealed into place via the thermally expandable material, the hollow cavity is separated into two separate chambers. Preferably, the inserts of the present invention are inserted into a cavity within an automotive vehicle and more preferably the cavity is part of a vehicle frame. The inserts are preferably located within the cavity prior to painting and/or priming activities so that the heat of a paint bake oven cures the expandable material.

Figure 1A:
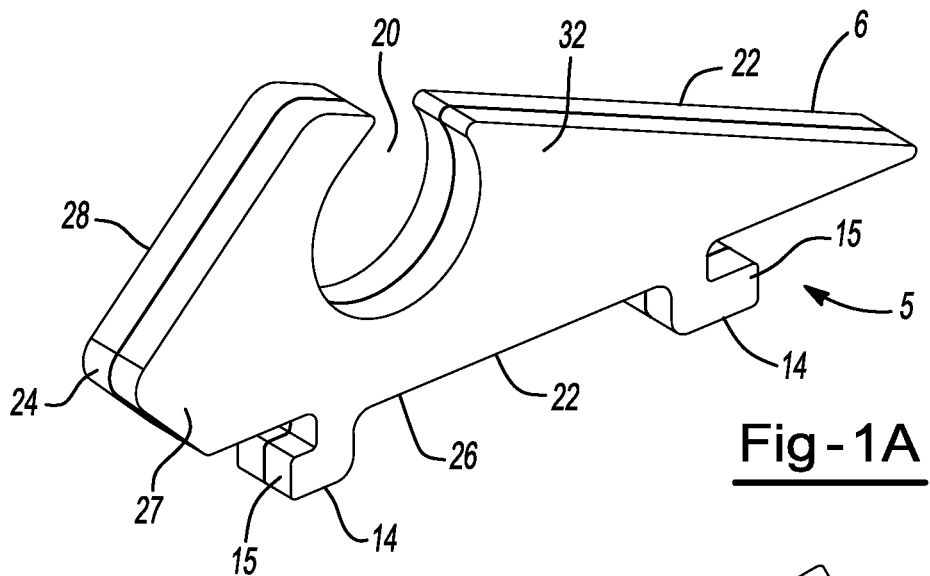
FIG. 1A illustrates a perspective view of one insert embodiment of the present invention (in a pre-expanded state).
Figure 1B:
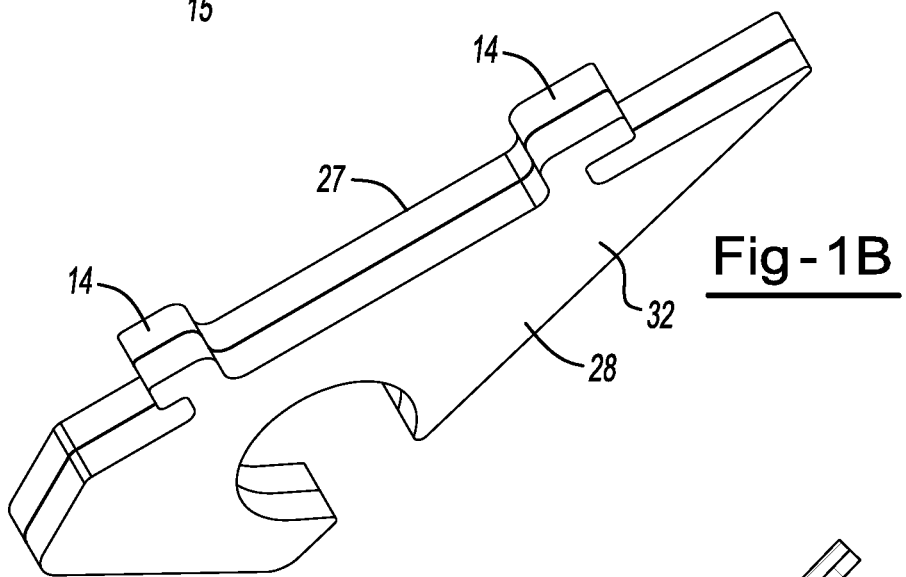
FIG. 1B illustrates an additional perspective view of the insert embodiment shown in FIG. 1A.

FIGS. 1A and 1B show one embodiment of the inserts of the present invention. The insert 5 is shown including a carrier 6 having a layer of thermally expandable material 32 placed thereon. The carrier includes two faces, a first face 27 and an opposing second face 28. The opposing faces of the carrier may include a surface topography that varies along the length of the carrier, or the surface topography may remain substantially consistent along the carrier. For example, the carrier may be a sheet-like structure and include generally parallel opposing faces. The carrier as shown includes a peripheral edge portion 22 such that a section of the peripheral edge portion 22 is an arcuate edge portion 24 and a section of the peripheral edge portion 22 is a substantially straight edge portion 26. The peripheral edge portion preferably includes at least three continuously adjoining edge portions. The peripheral edge portion may include at least four or at least five or more continuously adjoining edge portions.

The carrier 6 further includes an attachment 14, shown as two spaced apart projections that are integrally formed with the carrier. Preferably, the attachment 14 projects from the substantially straight edge portion 26 of the peripheral edge. The attachment may be generally coplanar with the faces of the carrier. In preferred embodiments, the attachment 14 includes one or more free ends 15 located at an end of a projection that is not in contact with the remainder of the insert. The free ends may extend transversely inward, or transversely outward. Preferably, the free ends extend away from one another such that the only means by which the attachment may be inserted through an aperture is by flexing. The flexing acts to temporarily reduce the distance between the free ends during insertion, where after insertion the free ends return to the same or substantially the same position as prior to flexing. The spacing between the free ends is sufficient so that during flexing the free ends do not contact one another without permanent deformation of the insert or possible destruction of the carrier. The space between the free ends may be 1 cm, 2 cm, 5 cm, 10 cm or more.

The insert may optionally include a cutout area 20 through which a vehicle component may be passed. The insert may include the expandable material covering only a portion of one or two of the faces of the carrier. The insert may include the expandable material covering substantially the entirety of one or more of the faces. The expandable material may cover only a portion of the one or more faces of the carrier. The thermally expandable material 32 may not extend beyond the peripheral edge portion 22 of the carrier. Alternatively, the thermally expandable material 32 may extend beyond the peripheral edge portion 22 in some areas of the carrier. Preferably, the thermally expandable material does not extend to cover any cutout portion.

Figure 1C:
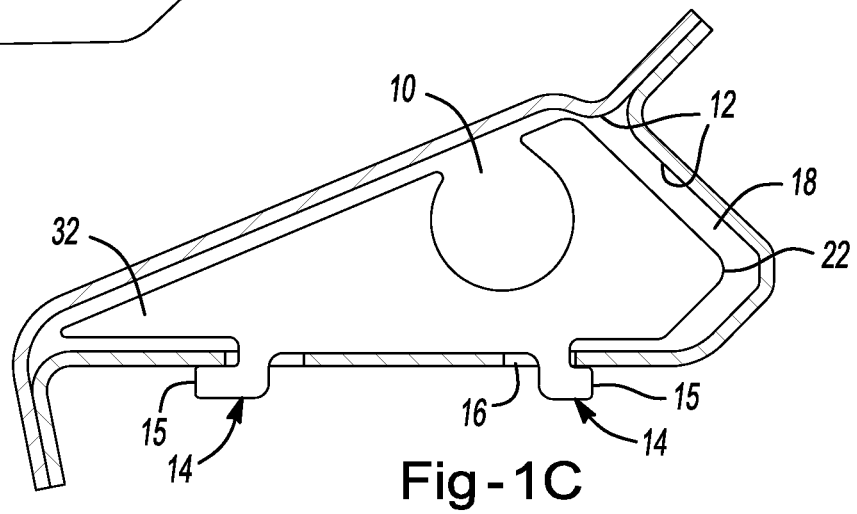
FIG. 1C illustrates the insert embodiment shown in FIGS. 1A and 1B located within a vehicle cavity.

FIG. 1C depicts the insert of FIGS. 1A and 1B when located within a hollow vehicle cavity 10. The cavity is defined by a cavity wall 12 containing one or more apertures 16. In preferred embodiments, the one or more apertures 16 are located in areas along the cavity wall 12 that correspond with the location of the attachment 14 of the insert so that the attachment may be inserted through the one or more apertures 16. The one or more apertures may be generally rectangular, generally circular, or any appropriate shape that allows entry of the insert attachment. After insertion into the apertures, the attachment may have some rotational capability such that the insert is capable of rotating about the apertures. The amount of rotation may be 10°, 20°, 30°, or more. Preferably, the insert is configured so that when it is flexed the free ends 15 of any attachment 14 will move to allow the free ends to pass through the apertures 16 in a structure, and upon release of the pressure of the flexing, the free ends 15 will optionally return to their original state from the elasticity of the material, such that the free ends form an interference fit that prevents removal of the free ends from the apertures. The intrinsic elasticity of the carrier may spring the flexed material toward its original configuration so that the attachments resist pull through from any aperture structures against which they are bearing. Once the attachment is inserted into the one or more apertures, the insert is preferably rotated so that it is located within the cavity in a transverse position.

Preferably, when the insert is placed within the cavity, a gap 18 is formed between the peripheral edge portion 22 and the cavity 12. The presence of the gap 18 allows for coatings or other materials to pass through the gap prior to expansion of the expandable material. When the thermally expandable material 32 is heated, the gap 18 will be filled and sealed. In preferred embodiments, the sealing of the gap 18 will result in the cavity being separated into two distinct chambers.

In preferred embodiments, the insert may be shaped so that when placed within a cavity in a transverse position, the shape of the insert is similar to that of the cavity so that size of the gap between the peripheral edge portion and cavity wall is relatively consistent around the insert. For example, the shape of the insert may be a generally triangular shape as shown in FIGS. 1A-1C. The shape of the insert may also be substantially rectangular, substantially circular, or any combination of the foregoing shapes. The shape of the insert may be any shape so that shape of the insert corresponds with the shape of the cavity.

FIGS. 2A and 2B show an additional embodiment of the inserts of the present invention, such that the insert is made up of more than one carrier 6. The inserts shown include two carriers, each having a main body portion, a portion that extends in an upward direction (e.g., an inboard position) 42 and a portion that extends in the opposite direction (e.g., an outboard position) 44. Preferably, the inserts both include an inboard position that is a different shape from the outboard position. In one embodiment, the inboard position, the outboard position, or both include a bulbous portion. The two carriers each have an attachment including two spaced apart projections such that the projections extend away from the main body portion. The multiple carrier parts may be fabricated from a common sheet of material to help avoid waste.

FIG. 2C illustrates the two carriers as inserted into a cavity 12. The cavity shown includes a dividing section 54 of the cavity wall 12 that divides the cavity wherein the dividing section of the cavity wall includes the apertures 16 for entry of the attachment 14 of the inserts. When inserted into the cavity, the two inserts are located on opposing sides of the dividing section 54 of the cavity wall 12. Once inserted, the attachment of each insert may contact the attachment of the other opposing insert as shown in FIG. 2C.

Figure 3A:
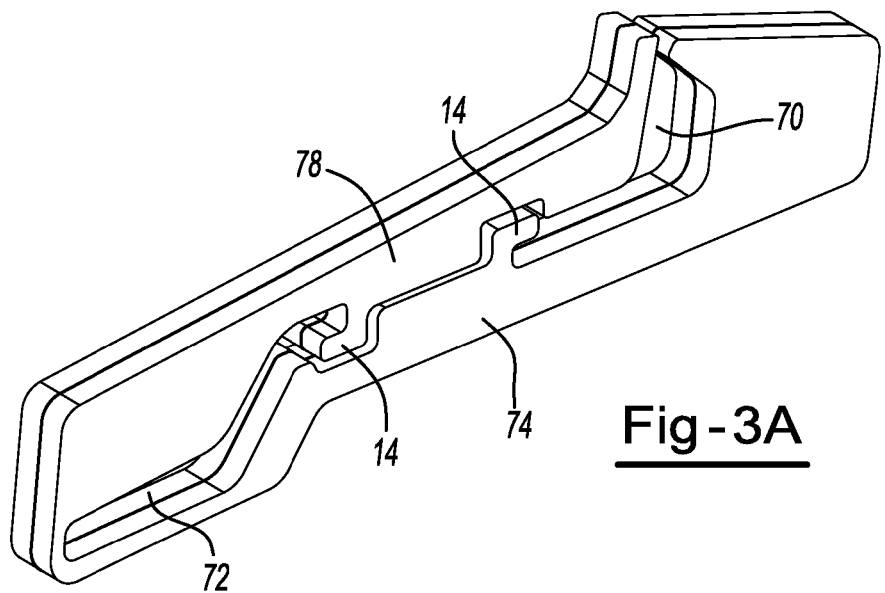
FIG. 3A illustrates a perspective view of another insert embodiment of the present invention (in a pre-expanded state).
Figure 3B:
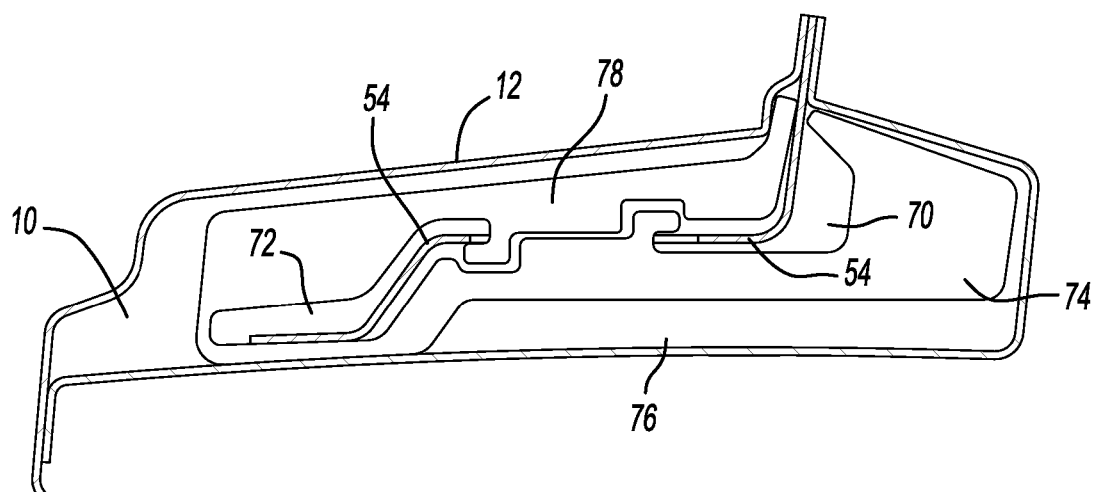
FIG. 3B illustrates the insert embodiment shown in FIG. 3A located within a vehicle cavity.

FIG. 3B depicts a similar cavity as shown in FIG. 2C, including a dividing section 54 of the cavity wall 12. However, only one insert is located within the cavity, such that the insert includes cutout areas 70, 72 that correspond with the dividing section 54 of the cavity wall. The cutout areas 70, 72 create a first top portion 78 and a second or bottom portion 74 of the insert. As shown in FIG. 3A, the insert includes an attachment 14 shown as two projections, the top portion 78 and the bottom portion 74 each including one of the projections.

Figure 4A:
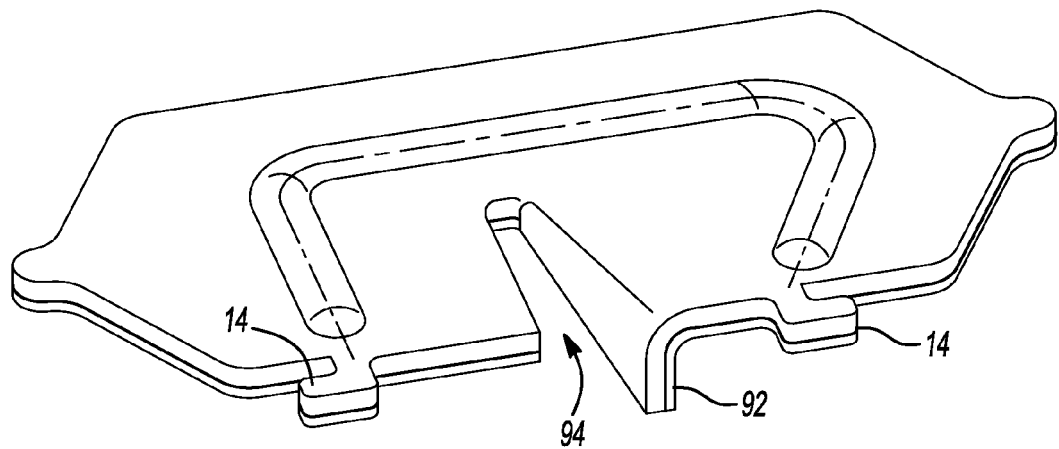
FIG. 4A illustrates a perspective view of an illustrative insert that includes an integrated structure configuration.
Figure 4B:
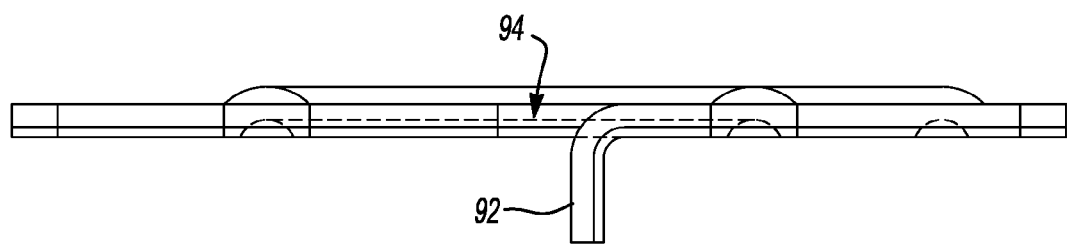
FIG. 4B illustrates a profile view of the insert shown at FIG. 4A.

FIG. 4A illustrates an additional embodiment of the insert, such that the insert includes an integrated structure 92. The integrated structure 92 is shown as a bend tab that may be substantially non-coplanar with the remainder of the insert. The integrated structure may include any structure that locally modifies the surface topography structure of the carrier or imparts at least one local property or performance modification within the carrier, or both. Examples of such integrated structures include, but are not limited to ribs, beads, dimples, bend tabs, notches or some other structure that includes a portion projecting away from the surface of the insert (e.g., so that the insert projects into each of the x, y and z planes of a Cartesian coordinate system). The integrated structure may be formed by subjecting the carrier to a secondary operation that deforms the carrier thereby forming the integrated structure. This secondary operation may be performed before or after any thermally expandable material is applied to the carrier. If the thermally expandable material is already applied to the carrier at the time of deformation, the thermally expandable material will undergo deformation as well, resulting in substantially the same sectional profile in both the carrier and expandable material. The resulting bend tab or other integrated structure will then project generally outward, such as in the longitudinal axis of the cavity. The insert is further shown as including an additional integrated structure formed as a notch. The notch may project inwardly from the peripheral edge of the carrier and adjoin the bend tab as shown. FIG. 4B shows a profile view of the insert depicting the decreasing thickness of the bend tab as the bend tab.

The integrated structure may extend only partially across the carrier and be bounded on one of its ends by the peripheral edge. The integrated structure may extend only partially across the carrier and be bounded on neither of its ends by the peripheral edge. The integrated structure may extend entirely across the carrier and be bounded on both of its ends by the peripheral edge. The integrated structure may extend substantially entirely across the carrier and be bounded on at least one of its ends by the peripheral edge. Preferably, the carrier including the integrated structure has substantially the same sectional thickness over its entire body.

In preferred embodiments, the carrier material is a flat metal sheet. Preferably the carrier material is a high strength to weight metal, such as aluminum, titanium, magnesium or any combination thereof. More preferably the metal is steel (e.g., a plain carbon steel). The carrier may also be made of a sheet molding compound or bulk molding compound such as that described in U.S. Pat. No. 7,313,865 incorporated by reference herein for all purposes. The carrier and may also include a variety of other materials such as polymers, elastomers, fibrous materials (e.g., cloth or woven materials), thermoplastics, plastics, nylon, combinations thereof or the like. The carrier may be a polymeric sheet. Multiple carrier parts may be fabricated from a common sheet of material (e.g., shim steel), such as is shown in FIGS. 2A and 3A, to help avoid waste.

The thickness of the carrier for the inserts for any of the embodiments herein is from about 5 to about 30 gauge (e.g., it is about 10 to about 25 gauge). For some carriers, they may be formed of shim steel (e.g., having a thickness less than about 1 mm, and preferably greater than about 0.1 mm). One or more layers of expandable material may have a thickness of about 0.5 to about 6 mm, more preferably about 1 to about 3 mm. Preferably, the thickness of the carrier is less than about 1 cm. Typical overall part thickness (including the expandable material) will be about 1 to about 6 mm, and more preferably about 3 to about 4 mm.

The thermally expandable material may be generally dry to the touch or tacky and may be shaped in any form of desired pattern, placement, or thickness, but is preferably of substantially uniform thickness. Though other heat-activated materials are possible for the expandable material, a preferred heat activated material is an expandable polymer or plastic, and preferably one that is foamable. A particularly preferred material is a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferred expandable materials include those available from L&L Products, Inc. under the designation L7220 or L2820. The expandable material may be die cut extruded sheets of material. It may be co-extruded with the carrier.

The expandable material may be mechanically attached to the carrier. The expandable material may also be bonded to the carrier over its entire surface or may be locally bonded to the carrier at selected locations (e.g., via a tacking type attachment).

The thermally expandable material is preferably activated when the insert undergoes heating in an electrocoat drying oven. Upon activation, the thermally expandable material may expand to anywhere from at least 100% to at least 2000% of its original volume. More preferably, the thermally expandable material may expand to anywhere from at least 1000% to at least 2000% of its original volume.

The attachment is preferably integrated in the shape of the insert. Preferably, the inserts are made by stamping or otherwise die-cutting a metal sheet to form the peripheral edge portion of the insert and the attachment. As such, the insert herein may be free of any separately fabricated fasteners.

The inserts of the present invention are preferably installed to an automotive vehicle although it may be employed for other articles of manufacture such as boats, buildings, furniture, storage containers or the like. The member may be used to reinforce seal or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

In one preferred embodiment, the reinforcement, sealing or baffling member is placed at least partially within a cavity of or adjacent to a component or structure of an automotive vehicle wherein the cavity or component is defined by one or more component walls or surfaces. Thereafter the expandable material is activated as described herein to expand, wet, core and adhere to one or more surfaces of the carrier and one or more surfaces of the component of the automotive vehicle. If reinforcement is desired, the expandable material preferably forms a rigid structural foam securing the member within the cavity of or adjacent to the component structure of the vehicle thereby reinforcing the component.

It will be appreciated that the following teachings pertain to all embodiments herein and illustrate features, characteristics and/or possible variations of the teachings herein.

The insert may also include an adhesive layer that comprises an outer surface of the insert. The carrier may be free of hinges or other structural modifications that locally control bending of the insert. The insert may be free of push-pin fasteners or other mechanical type fasteners. The insert may employ only a single sheet of carrier material. The insert may be free of any expandable material in contact with the peripheral edge of the carrier prior to expansion of the expandable material. The insert may include a plurality of sides with varying lengths, the lengths of some sides being substantially longer than the lengths of other sides. The attachment may extend from a longer side, a shorter side, or from any side. The attachment may extend from an edge that includes sections that are generally non-linear. The insert may be free of components adjacent to the attachment to assist in maintaining the projections within the apertures or maintaining the insert within the cavity. The peripheral edge may be free of any planar components having a thickness that is greater than the thickness of the sheet metal so that the insert is maintained within the cavity by only the thickness of the carrier material in a generally flat state.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items); such additional items are also contemplated, unless otherwise stated.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The specification of ranges herein also contemplates individual amounts falling within the range. Thus, for example, a range of 10 to 15 contemplates individually the amounts of 10, 11, 12, 13, 14, and 15.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A method for locally reinforcing or baffling a structure having a hollow cavity, comprising the steps of:
   i) providing an insert including a generally flat carrier having a first face and an opposing second face each terminating at a peripheral edge, wherein the carrier:

a. includes a thermally expandable polymeric material on at least a portion of one of the first or second faces; and b. includes at least one integrally formed flexible attachment that projects outwardly from the peripheral edge, wherein the flexible attachment includes thermally expandable polymeric material located thereon prior to expansion:

ii) flexing the insert during insertion into the cavity to be locked into place within the cavity via the at least one integrally formed flexible attachment;

iii) at least partially rotating the at least one integrally formed flexible attachment, so that after such rotating the first face and the second face project generally transversely into the cavity and a gap is defined between the peripheral edge and a wall of the structure;

iv) heating the thermally expandable polymeric material to cause it to expand and seal the gap that exists between the peripheral edge and the wall of the structure; thereby separating the hollow cavity into separate chambers on either side of the insert.

2. The method of claim 1, wherein the generally flat carrier is constructed of metal, polymeric material, elastomeric material, fibrous material, thermoplastic material, plastics, nylon, or any combination thereof.

3. The method of claim wherein the attachment includes at least two spaced apart projections.

4. The method of claim 1, wherein the generally flat carrier is a metal sheet.

5. The method of claim 4, wherein the attachment includes at least two spaced apart projections.

6. The method of claim 5, wherein the attachment includes a laterally projecting arm that has a free end.

7. The method of claim 5, wherein the insert includes two carriers, each of which is located within a separate cavity.

8. The method of claim 5, wherein the insert includes two carriers such that each of the carriers are located within a separate cavity and are substantially juxtaposed to each other within the resulting structure, but are separated by a wall of the structure.

9. The method of claim 1, wherein the attachment includes only one projection.

10. The method of claim 1, wherein the insert is held in place within the hollow cavity, prior to the heating step, solely by the attachment.

11. The method of claim 1, wherein the attachment includes a laterally projecting arm that has a free end.

12. The method of claim 11, wherein the free end projects transversely outward.

13. The method of claim 11, wherein the free end projects transversely inward.

14. The method of claim 1, wherein the carrier includes at least one cutout through which a component passes in the resulting final structure.

15. The method of claim 1, wherein the insert includes two carriers, each of which is located within a separate cavity.

16. The method of claim 1, wherein the insert includes two carriers such that each of the carriers are located within a separate cavity and are substantially juxtaposed to each other within the resulting structure, but are separated by a wall of the structure.

17. The method of claim 1, wherein the wall of the structure has one or more apertures, and wherein the attachment includes at least two laterally projecting arms that are spaced apart and when measured from center to center of the arms at the juncture of the peripheral edge are approximately the same spacing as the apertures into which they are inserted.

18. The method of claim 1, wherein the peripheral edge includes at least three continuously adjoining edge portions and the at least three continuously adjoining edge portions are joined by an arcuate edge portion.

19. The method of claim 1, wherein the peripheral edge includes at least one substantially straight edge portion.

20. The method of claim 1, wherein the peripheral edge includes at least one substantially straight edge portion from which the attachment projects.

21. The method of claim 5, wherein the peripheral edge includes at least one substantially straight edge portion from which the attachment projects.

22. The method of claim 1, wherein the insert includes at least one notch cut out from the peripheral edge.

23. The method of claim 1, wherein the insert includes a main body portion, a portion that projects upwardly from the main body portion, and a portion that projects downwardly from the main body portion, and wherein the attachment projects away from the main body portion.

24. The method of claim 1, wherein the peripheral edge of the insert without including the attachment, follows the contours of the hollow cavity.

25. A method for locally reinforcing or baffling a structure having a hollow cavity of a vehicle, comprising the steps of:

i) providing an insert including a generally flat carrier having a first face and an opposing second face each terminating at a peripheral edge having at least one substantially straight edge portion, wherein the carrier:

a. includes a thermally expandable polymeric material on at least a portion of one of the first or second faces;

b. includes at least one integrally formed flexible attachment that projects outwardly from the peripheral edge, wherein the flexible attachment includes at least two spaced apart projections, and wherein the flexible attachment includes thermally expandable polymeric material located thereon prior to expansion: and c. includes at least one integrated structure that locally modifies the surface topography structure of the carrier, imparts at least one local property or performance modification within the carrier, or both;

ii) flexing the insert during insertion into the cavity to be locked into place within the cavity via the at least one integrally formed flexible attachment;

iii) at least partially rotating the at least one integrally formed flexible attachment, so that after such rotating the first face and the second face project generally transversely into the cavity and a gap is defined between the peripheral edge and a wall of the structure;

iv) heating the thermally expandable polymeric material to cause it to expand and seal the gap that exists between the peripheral edge and the wall of the structure; thereby separating the hollow cavity into separate chambers on either side of the insert.

* * * * *

UNITED STATES PATENT AND TRADEMARK OFFICE
CERTIFICATE OF CORRECTION

| | |
|---|---|
| PATENT NO. | : 8,758,535 B2 |
| APPLICATION NO. | : 12/405276 |
| DATED | : June 24, 2014 |
| INVENTOR(S) | : White et al. |

It is certified that error appears in the above-identified patent and that said Letters Patent is hereby corrected as shown below:

In the Claims:

Column 9, Line 26, delete "The method of claim wherein" and insert --The method of claim 1, wherein--

Signed and Sealed this
Seventh Day of October, 2014

Michelle K. Lee
*Deputy Director of the United States Patent and Trademark Office*